July 14, 1931. C G H. DEPPE 1,814,900
LOCK HOOK
Filed Jan. 14, 1931
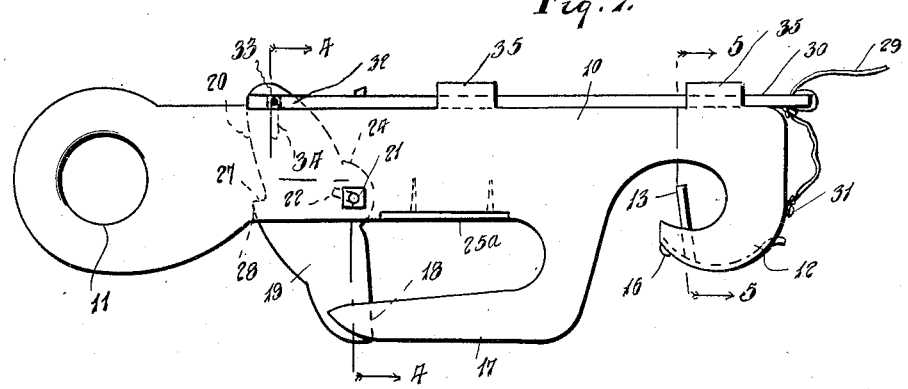
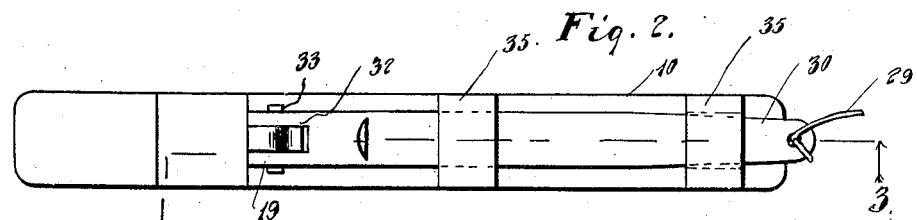
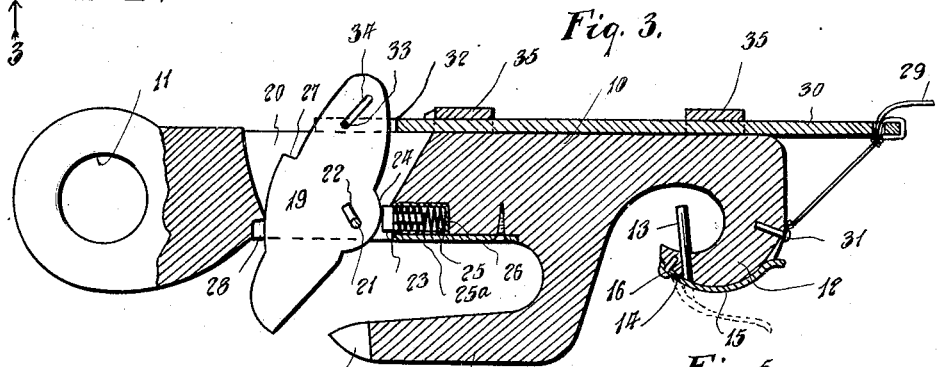
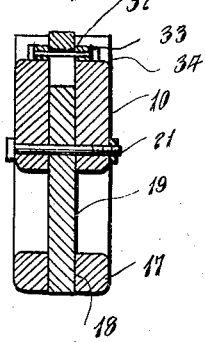
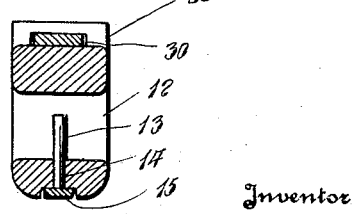
Inventor
C G Henry Deppe.
By L. F. [signature]
Attorney Patented July 14, 1931

1,814,900

UNITED STATES PATENT OFFICE

C G HENRY DEPPE, OF PORTLAND, OREGON

LOCK HOOK

Application filed January 14, 1931. Serial No. 508,772.

This invention relates to a lock hook primarily but not necessarily adapted for use in connection with nets used in the stacking of hay.

It is aimed to provide a novel construction in which the engaged rings or the like will not accidentally become detached and a construction which may nevertheless be readily operated to release the rings or the like.

Another object is to provide a novel construction in which the locking member in locked position has shoulder engagement with the body of the hook proper and also has an inclined slot and pin connection under spring control, to enable the accomplishment of the object in view.

The more specific objects and advantages will become apparent from a consideration of the description following taken in connection with accompanying drawings illustrating an operative embodiment.

In said drawings:—

Figure 1 is a front elevation of the lock hook,

Figure 2 is an edge elevation thereof,

Figure 3 is a sectional view taken on the line 3—3 of Figure 2,

Figure 4 is a sectional view taken on the line 4—4 of Figure 1, and

Figure 5 is a sectional view taken on the line 5—5 of Figure 1.

Referring specifically to the drawings, 10 designates a hook body of any appropriate size, shape or material, steel being preferred. The body has an eyelet 11 at the front and a hook 12 at the rear whereby connection may be made with cables, or hooks or rings thereon, for pulling and returning said hook in connection with the stacking of hay or for other purposes. In order to maintain the rope or cable or a ring thereon in engagement with the hook 12 against detachment, and yet permit opening of the hook sufficiently to receive the rope or cable or ring, a pin 13 is loosely disposed in an opening 14 at the bill of the hook 12 which is of greater length than the width of the hook opening and held in place by a spring leaf at 15 fastened to the hook at 16. When the leaf at its free end is pulled away from the hook, the pin 13 may recede in order that the ring can engage the hook, after which the spring 15 returns to the normal position of Figure 3, moving the pin 13 to a position preventing displacement of the ring.

A hook 17, adapted to receive the rings of a net used in stacking hay or other material, and which are usually connected to the net at different positions, is formed integral with the body 10. The bill of such hook 17 is bifurcated as at 18 and coacting with the mouth or entrance of such hook 17 is a locking member 19. Locking member 19 is freely movable in a cut away portion or recess 20 of the body 10 and is connected thereto by means of a bolt or rod 21 passing through an elongated slot 22 of the locking member. The locking member is held in both open and closed position through the engagement of a spring pressed plunger 23, contacting with a cam or curved face 24 on the locking member. The plunger 23 is mounted in a housing 25 secured to plate 25ᵃ and is recessed into the body 10. 26 designates a spring mounted in said housing 25 and holding said plunger in engagement with the curved or cam face 24.

In the closed position of the hook, the locking member 19 at a shoulder 27 thereof is in engagement with a shoulder 28 on the body. Thus it will be seen that if pressure is applied against the locking member 19 in a direction to disengage the same, that is toward the eyelet 11, the shoulders 27 and 28 will prevent opening of the locking member 19.

At the same time, when it is desired to move the locking member 19 to open position, this may be readily accomplished by pulling a flexible element 29, fastened to a slide 30 and to the body at 31. The slide 30 is bifurcated as at 32 to receive the locking member 19 and is secured thereto by means of a pin 33 engaging in an elongated slot 34. The slide 30 is guided in its movement by loops 34 formed integral with the body 10.

It will be realized, that when the slide 30 is pulled to the right, the slip connection at 33—34 and 22—21 enables the shoulders 27—28 to disengage and the locking member to move from the locked position of Figure 1 to the open position of Figure 3.

Various changes may be resorted to provided they fall within the spirit and scope of the invention.

I claim as my invention:—

1. A device of the class described having a body, a hook formed integral with said body, a locking member for coacting with the end of said hook, coacting shoulders on the body and locking member to prevent disengagement of articles from the hook, spring means maintaining the locking member in position with said shoulders engaged, and a slip connection between the locking member and body.

2. A device of the class described having a body provided with a hook, a locking member for said hook, coacting shoulders on the body and locking member to prevent disengagement of articles from the hook, spring means maintaining the locking member in position with said shoulders engaged, and a slip connection between the locking member and body consisting of an inclined slot and a rod passing therethrough.

3. A device of the class described having a body provided with a hook, a locking member for said hook, coacting shoulders on the body and locking member to prevent disengagement of articles from the hook, spring means maintaining the locking member in position with said shoulders engaged, a slip connection between the locking member and body, said locking member having a cam with which said spring means coacts.

4. A device of the class described having a body provided with a hook, a locking member for said hook, coacting shoulders on the body and locking member to prevent disengagement of articles from the hook, spring means maintaining the locking member in position with said shoulders engaged, a slip connection between the locking member and body, and means connected with the locking member on the side of its axis opposite to the hook and operable to move it to open position.

5. A device of the class described having a body provided with a hook, a locking member for said hook, coacting shoulders on the body and locking member to prevent disengagement of articles from the hook, spring means maintaining the locking member in position with said shoulders engaged, a slip connection between the locking member and body, means connected with the locking member on the side of its axis opposite to the hook and operable to move it to open position consisting of a slide, and guide means on the body for said slide.

6. A device of the class described comprising a body having a hook, a closing pin for the hook mounted slidably therein, and a spring means maintaining said closing pin in place and permitting displacement of the closing pin through movement thereof relatively to the hook.

In testimony whereof I affix my signature.

C G HENRY DEPPE.